United States Patent
Morbieu et al.

(10) Patent No.: US 6,956,680 B2
(45) Date of Patent: Oct. 18, 2005

(54) NETWORK STRUCTURE USING HIGH DISPERSION VOLUME HOLOGRAPHY

(75) Inventors: Bertrand Morbieu, Bruges (FR); Jean-Jacques Laborie, St Jean d'Illac (FR)

(73) Assignee: Thales Avionics S.A., Velizy Villacoublay (FR)

( * ) Notice: Subject to any disclaimer, the term of this patent is extended or adjusted under 35 U.S.C. 154(b) by 16 days.

(21) Appl. No.: 10/168,536

(22) PCT Filed: Dec. 28, 2000

(86) PCT No.: PCT/FR00/03726

§ 371 (c)(1),
(2), (4) Date: Jul. 1, 2002

(87) PCT Pub. No.: WO01/50554

PCT Pub. Date: Jul. 12, 2001

(65) Prior Publication Data

US 2003/0002097 A1  Jan. 2, 2003

(30) Foreign Application Priority Data

Dec. 30, 1999 (FR) .................................. 99 16777

(51) Int. Cl.⁷ .............................................. G02B 5/32
(52) U.S. Cl. ...................................... 359/15; 359/569
(58) Field of Search ............................... 359/15, 1, 34, 359/566, 569; 372/21, 25; 398/82, 87

(56) References Cited

U.S. PATENT DOCUMENTS 4,834,474 A    5/1989  George et al. .................. 359/8
5,153,670 A *  10/1992 Jannson et al. .............. 356/301
6,157,471 A    12/2000 Bignolles et al. ............. 359/15
6,275,630 B1 * 8/2001  Yang et al. ..................... 385/37
6,643,039 B1 * 11/2003 Sato et al. ..................... 359/15

FOREIGN PATENT DOCUMENTS

JP         08297458 A  * 11/1996    ............ G03H 1/24

OTHER PUBLICATIONS

J. A. Arns, W. S. Colburn, S. C. Barden, 'Volume phase gratings for spectroscopy, ultrafast laser compressors, and wavelength division multiplexing', Proc. SPIE, vol. 3779, Jul. 1999, pp. 313-323.*

P. Hariharan, "Optical holography- Principles, techniques, and applications", Cambridge University Press, Cambridge, 1996, pp. 213-223.*

(Continued)

*Primary Examiner*—Thong Nguyen
*Assistant Examiner*—Arnel C. Lavarias
(74) *Attorney, Agent, or Firm*—Oblon, Spivak, McClelland, Maier & Neustadt, P.C.

(57) ABSTRACT

A grating structure by high dispersion volume holography that applies, for example, to pulse compression or stretching devices. The grating structure includes a transmission volume holographic grating produced on a reflective support. The grating includes strata inclined to the plane of the support, the angle of inclination of the strata defined with respect to the normal to the support and the pitch of the strata being chosen such that a light beam of a predetermined mean wavelength, incident on the structure with a predetermined angle of incidence, undergoes a first passage through the grating, is reflected by the reflective support, undergoes a second passage through the grating, and is only diffracted by the grating during one of the first and second passages.

18 Claims, 2 Drawing Sheets

OTHER PUBLICATIONS

R. Guenther, 'Modern Optics', John Wiley & Sons, New York, 1990, pp. 485-4893*

B. Loiseaux et al.: "Phase volume holographic grating for high energy lasers" Solid State Lasers for Application to Inertial Confinement Fusion: Second Annual International Conference, Paris, France, vol. 3047, pp. 957-962 Oct. 22, 1996-Oct. 25, 1996.

Rhee June-Koo et al.: "Chirped-pulse amplicfication of 85-FS pulses at 250 khz with third-order dispersion compensation by use of holographic transmission gratings" Optics Letters, vol. 19, No. 19, pp. 1550-1552 Oct. 1, 1994.

Yang Tsung-Yuan et al.: "Femtosecond laser pulse compression using volume phase transmission holograms" Applied Optics, vol. 24, No. 13, pp. 2021-2023 Jul. 1, 1985.

B. Loiseaux et al.: "Characterization of perpendicular chirped phase volume grating pairs for laser pulse stretching" Optics Letters, vol. 21, No. 11, pp. 806-808 Jun. 1, 1996.

* cited by examiner

NETWORK STRUCTURE USING HIGH DISPERSION VOLUME HOLOGRAPHY

BACKGROUND OF THE INVENTION

1. Field of the Invention

The invention concerns a grating structure by high dispersion volume holography. It applies in particular in pulse compression or stretching devices, e.g. for the production of ultrashort or very high energy laser pulses. It also applies in the field of optical telecommunications, e.g. for wavelength division multiplexing devices or wave trap devices.

2. Discussion of the Background

In the fields of physics and chemistry, numerous analyses and many types of processing require the use of very short, high-energy laser pulses. For example, very powerful laser pulses are required in the field of plasma physics. Pulses with very high peak power are also useful in the field of machining materials, since they result in cleaner and more accurate contours, by reducing the heating of the materials machined.

To date, the production of very high peak power laser pulses (Tera or Peta Watts) uses the CPA (Chirped Pulse Amplification) technique. This technique consists of:

- stretching a low energy femtosecond pulse to make it nanosecond,
- amplifying its energy,
- compressing the high energy pulse obtained to make it femtosecond.

We therefore obtain an ultrashort, very high energy pulse, i.e. of very high peak power.

Traditionally, the pulse stretching and compression operations are carried out using diffraction gratings, according to an arrangement recommended by Treacy (IEEE Journal of Quantum Electronics, vol QE-5 No. 9, September, 1969 p. 454–458) of which a simplified diagram is shown in FIG. 1. The arrangement represented in FIG. 1, for example a pulse compressor, comprises in particular two diffraction gratings 11, 12 arranged parallel to each other. The first grating 11 receives at an angle of incidence $\theta$ to the normal, an incident laser pulse $F_{IN}$ (represented with a single arrow) whose wavelength components are variable around a mean central wavelength $\lambda_0$. The diffracted beam is diffracted in turn by the second parallel grating 12, thereby forming a beam parallel to the incident beam. This beam is reflected by reflecting means 13 to the second grating 12 (beam indicated with a double arrow) and follows a return path identical to the outgoing path, forming, at the output of the first grating 11, the output beam $F_{OUT}$. The property of diffraction gratings to diffract the components with different wavelengths by a different angle depending on the wavelength is used. Thus, FIG. 1 represents the optical path for two components with wavelengths $\lambda$ (dotted line) and $\lambda'$ (solid line), where $\lambda'$ is greater than $\lambda$. The optical path and therefore the travel time taken by the component at $\lambda'$ is greater than that of the component at $\lambda$, so that the pulse energy is concentrated in the output beam $F_{OUT}$ in a very short period for all wavelengths.

The diffraction gratings used until now are engraved gratings, i.e. gratings with lines engraved on the surface at a regular pitch. However, they do not offer complete satisfaction. A disadvantage with engraved gratings is that their throughput, approximately 90%, only results in a low compression efficiency, approximately 65%. Another disadvantage of these engraved gratings is that they display poor resistance to the laser flow. For example, for a pulse of wavelength 1053 nm and a duration of 250 femtoseconds, the gold engraved gratings display a resistance to laser flow of less than 1 J/cm$^2$.

Consequently, users equipped with installations producing considerable energy are unable, in practice, to fully benefit from all the power they would expect from an efficient compressor and/or stretcher.

SUMMARY OF THE INVENTION

The main purpose of the invention is to overcome these disadvantages of the prior art.

To achieve this, one objective of the invention is to supply a grating structure by volume holography with high dispersive power, such that, in particular, it can be introduced in a Treacy type arrangement and which in addition displays very good stretching or compression efficiency as well as better resistance to laser flow than the diffraction gratings of the prior art.

More precisely, the invention concerns a grating structure by high dispersion volume holography, wherein it comprises a transmission volume holographic grating produced on a reflective support, the said grating consisting of strata inclined to the plane of the support, the angle of inclination of the strata defined with respect to the normal to the support and the pitch of the strata being chosen such that a light beam of given mean wavelength, incident on the said structure with a given angle of incidence, undergoes a first passage through the grating, is reflected by the reflective support, undergoes a second passage through the grating and is only diffracted by the grating during one of the said passages.

In addition to its applications in the field of pulse compression and/or stretching, the structure according to the invention is suitable for other applications due to its high dispersive power, especially in the field of optical telecommunications. In particular, the invention concerns a wavelength division multiplexing (WDM) device and a wave trap device implementing the grating structure according to the invention.

BRIEF DESCRIPTION OF THE DRAWINGS

Other advantages and features of the invention will be clearer on reading the following description, illustrated by the attached figures representing in:

On the figures, the identical elements are indexed using the same references.

FIGS. 2 and 3 represent two examples of realisation of grating structure by volume holography according to the invention.

DESCRIPTION OF THE PREFERRED EMBODIMENTS

Figure 1:
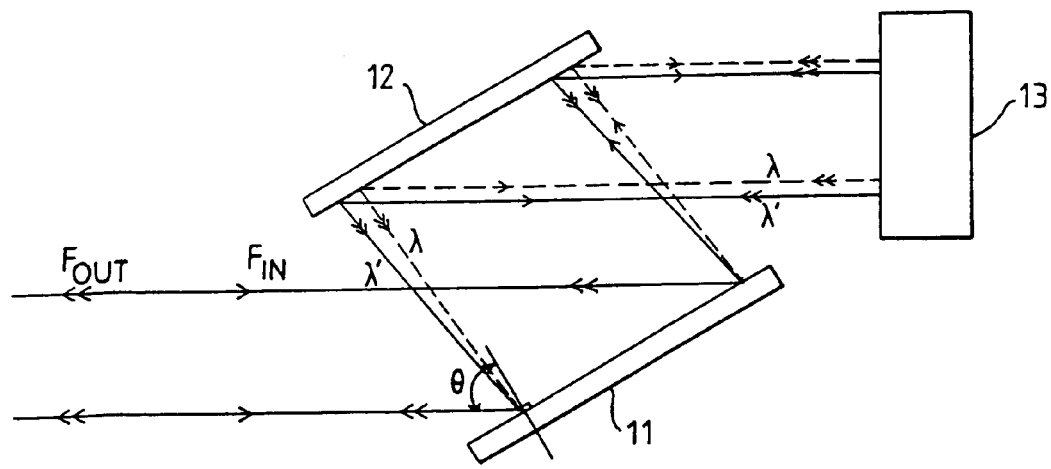
FIG. 1, the simplified diagram of a Treacy arrangement (already discussed)

The grating structure according to the invention comprises in particular a transmission volume holographic grating produced on a reflective support. The volume grating is formed from a thick layer (a few dozen microns) of a holographic material in which strata of given pitch $\Lambda$ are inscribed, inclined with respect to the plane of the layer support at a given angle $\phi$ defined with respect to the normal to the support. The angle of inclination $\phi$ and the pitch of the strata $\Lambda$ are chosen such that a light beam of given mean central wavelength $\lambda_0$, incident on the said structure with a given angle of incidence $\theta$, undergoes a first passage through the grating, is reflected by the reflective support, undergoes a second passage through the grating and is only diffracted by the grating during one of the said passages. In practice, since the angle of incidence of the beam is given (preferably close to the Brewster angle to avoid reflections at the interface), the pitch of the strata is determined according to the mean central wavelength. The angle of inclination of the strata is chosen according to the type of reflective support used, to introduce a dissymmetry in the direction of beam propagation with respect to the direction of the strata during the first and second passages, which will result in diffraction during only one of the said passages.

Due to this type of structure, the diffracted beam emerges at an angle close to the angle of incidence $\theta$. The resulting grating structure therefore has high dispersive power, which means that it can be used in a Treacy type arrangement as described previously. The device obtained is then highly efficient. The efficiency of a volume grating, in fact, is above 98%, which means that a compression efficiency of approximately 92% can be obtained, i.e. a gain of some 40% as compared with engraved gratings. In addition, the holographic materials display good resistance to the laser flow, for example approximately 2 J/cm$^2$ and 4 J/cm$^2$ for a pulse of wavelength 1053 nm and duration 250 femtoseconds.

In the grating structure according to the invention, instead of having a reflection grating acting in direct diffraction, a transmission volume grating is used according to the invention which, for example, allows the incident beam to pass without diffraction to the reflective support, and which then receives the reflected beam and diffracts it (with an angle of diffraction that depends on the wavelength. Direct diffraction is therefore replaced by a "transmission without diffraction—reflection-transmission with diffraction", or "transmission with diffraction—reflection-transmission without diffraction" sequence, the transmission without diffraction and the transmission with diffraction being carried out by the same layer containing the transmission volume holographic grating. Apart from providing better resistance to the laser flow than the engraved gratings of the prior art, this structure offers the advantage for example compared with reflection holographic gratings, of being much easier to produce technologically. To obtain the same dispersion, in fact, the applicant has demonstrated that the pitch of the strata in a reflection grating should be smaller, and the angle of inclination of the strata large (a few dozen degrees), making the recording of the grating very difficult in practice, at the usual recording wavelengths in the traditional holographic materials.

Figure 2:
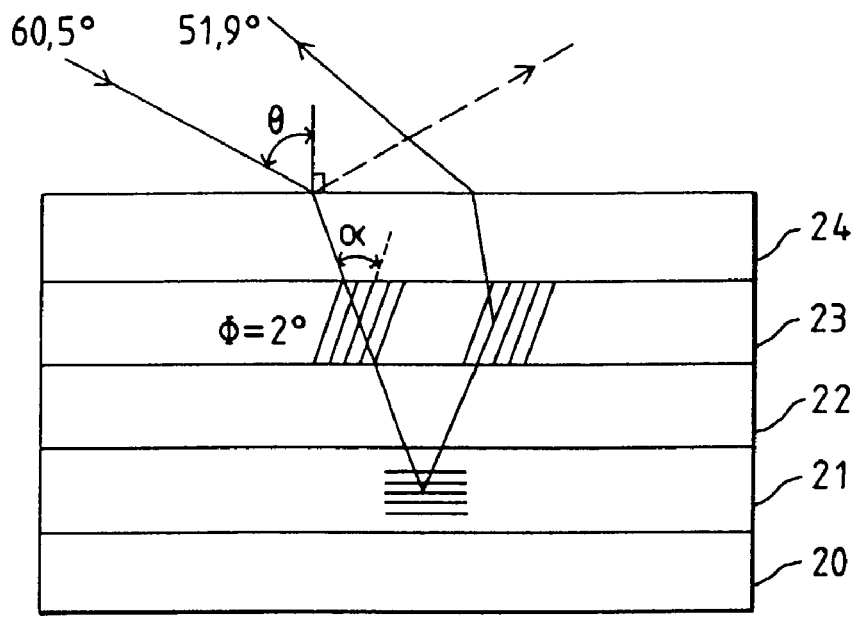
FIG. 2, a first mode of realisation of the grating structure according to the invention, implementing a transmission grating with inclined strata on a dielectric or holographic mirror.

According to a first mode of realisation of the invention, illustrated in FIG. 2, the transmission volume grating is a grating with strata inclined to the plane of the support, but not perpendicular to it, produced on a reflective support which is, for example, a dielectric mirror or a holographic mirror with non inclined strata. The applicant has demonstrated that for a beam incident on the structure with an angle $\theta$ of approximately 60.5° to the normal and an angle of inclination of the strata to the normal to the support of approximately 2°, the required result is obtained.

Figure 3:
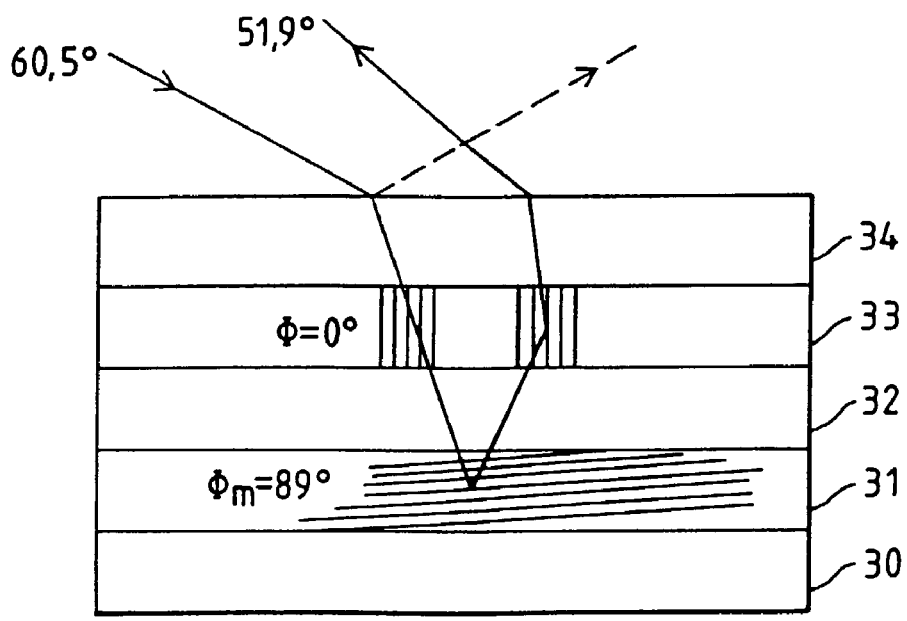
FIG. 3, a second mode of realisation of the grating structure according to the invention, implementing a transmission grating with perpendicular strata on a holographic mirror with inclined strata.

According to a second mode of realisation of the invention, illustrated in FIG. 3, the said transmission volume grating is firstly a grating with perpendicular strata and secondly the said reflective support is a holographic mirror with inclined strata. The applicant has demonstrated that in this example, for a beam incident on the structure with an angle $\theta$ of approximately 60.5°, as previously, and an angle of inclination of the strata of the reflection grating forming the reflective support to the normal to the support of approximately 89°, the required result is obtained.

We will now give a more detailed description of the examples of realisation illustrated in FIGS. 2 and 3 which show the components comprising grating structures according to the invention, adapted to pulse compression or stretching means, e.g. for a device used to generate ultrashort, very high energy pulses using a Treacy type arrangement. The structures described below are adapted for pulses generated by a Neodymium-doped YAG laser (mean central wavelength of approximately 1.053 µm).

The components described operate for "parallel" (or transverse magnetic, TM) polarisation, such that the electric field is in the plane of incidence defined by the normal to the component and the wave vector of the incident wave. The angle of incidence is close to the Brewster angle, which reduces the reflection at the interface between the external medium and the structure. It is determined according to the desired application. In the example in FIGS. 2 and 3, an incident beam at an angle $\theta$ of approximately 60.5° to the normal to the support meets the constraints of the Treacy arrangement.

The component represented in FIG. 2 comprises a support 20 which could be made from glass, for example of type BK7. The support 20 is coated with a mirror 21 forming the reflective support. The mirror 21 is for example a multidielectric mirror. According to a mode of realisation of the invention, it may consist of a stack of pairs of $SiO_2$—$HfO_2$ layers. For example, the external layer may be a layer of $SiO_2$. According to a variant, it may also be a reflection volume grating with non inclined strata (holographic mirror), adapted to the wavelength of the incident beam.

According to this example, the mirror 21 is coated with a buffer layer 22 resistant to the laser flow, itself covered with a thick layer (several dozen microns) of a holographic material 23, which forms the transmission volume holographic grating. The buffer layer 22 may consist of a transparent material such as $SiO_2$ for example, preferably deposited using a sol-gel process. It has advantageously a refractive index similar to that of the holographic material 23 and thickness such that, for the length of the laser pulse considered, the holographic grating so formed no longer causes interference between the incident wave and the reflective wave. The holographic material is for example dichromated gelatine, photopolymer, or material produced using a sol-gel process. Tests on the resistance to the laser flow with femtosecond pulses have in fact demonstrated good behaviour of the above-mentioned holographic materials (for example, 4 to 5 J/cm$^2$ for the dichromated gelatine and 2 J/cm$^2$ with a photopolymer).

In the example shown in FIG. 2, the material 23 used is for example a photopolymer material inscribed with strata of pitch $\Lambda$ (a few hundred nanometres) inclined at angle $\phi$ approximately 2° to the normal to the support. Depending on the angle of incidence α of the laser beam to these strata, the beam sees in its direction of propagation strata separated by a pitch $\Lambda/\cos\alpha$. There is a critical angle of incidence of the laser beam to the strata, for which the laser beam sees strata evenly distributed at a pitch equal to the wavelength (or multiple or sub-multiple of the wavelength). For this critical angle $\alpha_{cr}$ the grating is highly diffractive and reflects the beam at an angle which depends on the wavelength. As soon as we move away from this angle, even by 1 or 2°, the grating is no longer diffractive and it is crossed without modification by the laser beam.

An anti-reflection layer 24 can be deposited at the interface between the external medium and the said volume holographic grating, especially when the incident beam is in perpendicular polarisation, in order to minimise the reflection losses.

We will now give an example of numerical values for this mode of realisation. The thickness of the mirror 21 is approximately equal to 10 microns, the buffer layer 22 has a thickness of 25 microns, the layer of holographic material 23 has a modulation of index 0.04 and a thickness of approximately 30 microns. The strata are inclined at an angle ϕ of approximately 2° to the normal to the support and the pitch of the strata is approximately 630 nm for the chosen mean wavelength (1.053 μm). The indices of the anti-reflection 24, buffer 22 and mirror 21 layers are approximately the same.

According to the mode of realisation illustrated in FIG. 2, the incident wave is successively subject to the following effects. It is transmitted through the interface between the air and the anti-reflection layer 24. The reflection losses are minimised due to the state of the polarisation and the angle of incidence. It is then transmitted through the anti-reflection layer to the interface with the holographic layer, then through the holographic layer. The angle of incidence of the beam to the strata of the holographic layer grating is sufficiently different from the critical angle $\alpha_{cr}$ for the holographic layer to remain transparent to the beam. The difference is due to the angle ϕ (angle of inclination of the grating strata); it is approximately 2°. The incident wave then crosses the buffer layer, is reflected on the dielectric mirror and goes back through the buffer layer to the holographic grating of layer 23. On return, however, the angle of incidence on the strata is different. It is very close to the critical angle, resulting in very high diffraction by the holographic grating and modification of the output angle depending on the wavelength. The emerging beams are then transmitted through the holographic layer-air interface. The reflection losses are minimised due to the state of the polarisation and the angles of approximately 60°.

Consequently, for an input beam incident at 60.5°, the output beam leaves at an incidence of 51.9° for the mean wavelength of 1053 nm, the output incidence varying with the wavelength. We can therefore produce, for example, a transmission grating whose characteristics are such that nearly 100% of the wave incident at 60.5° is transmitted by the said grating, and nearly 100% of the wave previously transmitted then reflected by the said reflective support is diffracted by the said grating to leave on average at 51.9°. Gratings with high diffraction efficiency and large size (diameter approximately 150 mm) have therefore been produced according to the invention on dielectric mirror. Obviously, according to the principle of inverse propagation of light, we can also work with a beam incident on the structure with an angle θ of approximately 52°. It will be diffracted the first time it passes through the holographic layer 23 through an angle which depends on the wavelength. The beams so diffracted will be reflected by the mirror 21, then transmitted without diffraction by the holographic grating 23 to emerge from the structure with an angle of approximately 60°.

We will now describe, in relation to FIG. 3, a second mode of realisation of a grating structure according to the invention for a Neodymium-doped YAG laser of mean wavelength 1053 nm.

The component shown in FIG. 3 comprises a support 30 covered with a holographic mirror 31 with strata slightly inclined with respect to the layer ($\phi_m$=89° to the normal to the layer) and which forms the reflective support according to the invention. The holographic mirror in this example also disperses the wavelengths, but not significantly due to the slight inclination of the strata with respect to the support. A buffer layer 32, resistant to the laser flow, with characteristics similar to those described in the first mode of realisation, covers the holographic mirror 31. A holographic material 33, of the same type as that described previously, is deposited on the layer 32 so as to form the transmission volume holographic grating. In this example however, the strata are almost perpendicular to the layer (ϕ=0°). The angle of incidence is almost equal to 60.5°, and the diffracted angle is almost equal to 51.9° for the mean wavelength 1053 nm. An anti-reflection layer 34 may also be provided.

In this example, the dissymmetry during the first and second passages, in the direction of propagation of the beam compared with the direction of the strata on the transmission grating 33 (angle of incidence α), is obtained due to the inclination of the strata on the reflection volume holographic grating forming the reflective support 31. The examples shown are not exhaustive and this dissymmetry, whereby the beam is diffracted by the transmission grating only in one direction, can be obtained by other configurations using the transmission grating and the reflective support. The advantages of the examples described in FIGS. 2 and 3 include the implementation of a thin multilayer structure, highly resistant to the flow, especially since there is no need to insert additional lamina, for example made from glass, which might not be able to withstand the very high energies, between the layers forming the transmission hologram and the reflective support.

The components described in FIGS. 2 and 3 apply in particular to pulse compression or stretching means and to a device which generates pulses of very high peak power including such compression and/or stretching means.

Other applications are possible for the grating structure according to the invention, which make use of its high dispersive power and excellent efficiency. For example, in the field of optical telecommunications.

Figure 4:
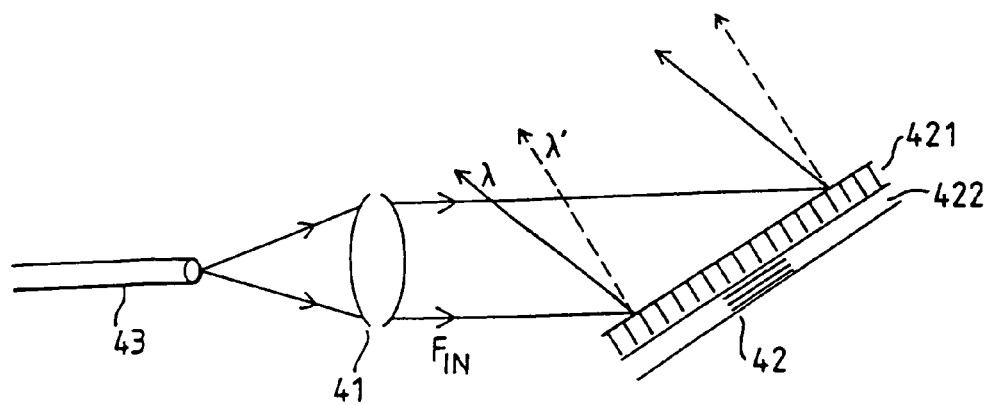
FIG. 4, the diagram of an example of WDM type device implementing the grating structure according to the invention.

FIG. 4 is a diagrammatic representation of a traditional arrangement in optical telecommunications for Wavelength Division Multiplexing (WDM). This arrangement comprises collimation optics 41 and a diffracting element 42. The collimation optics 41 forms from a light beam of given mean wavelength output from an optical fibre 43 a parallel beam $F_{IN}$ on the diffracting element 42, in order to separate the beam components (or channels) into the various wavelengths. On the diagram of FIG. 4, two components with wavelengths λ and λ' are shown.

The invention proposes a multiplexing device which implements the grating structure by volume holography according to the invention, forming the diffracting element 42. According to the invention, it consists of a transmission volume grating 421 produced on a reflective support 422. Due to its high dispersive power, it is capable of resolving wavelengths separated by a few fractions of a nanometre (0.2 to 0.5 nm), which could be extremely useful, especially when it is necessary to work with numerous channels. The pitch of the strata of the transmission volume grating 421 is determined according to the mean central wavelength of the incident beam (for example around 1.5 µm).

The invention also proposes a wave trap device for optical telecommunications, in order to separate a given wavelength from a packet of wavelengths. According to the invention, it comprises a grating structure by high dispersion volume holography as previously described. The characteristics of the structure are chosen so that the structure is adapted to the wavelength to be trapped, resulting in diffraction during only one of the passages in the transmission grating of the component of the incident beam at the said wavelength. The components at the other wavelengths are reflected without diffraction by the structure and therefore emerge from the structure in a direction different from the component which was diffracted, thereby separating them.

What is claimed is:

1. A grating structure for high dispersion volume holography, comprising:
    a transmission volume holographic grating produced on a reflective support, the grating including inscribed strata inclined to a plane of the support, an angle of inclination of the strata defined with respect to a normal to the support and a pitch of the strata being chosen such that a light beam of a predetermined mean wavelength, incident on the structure with a predetermined angle of incidence, (1) undergoes a first passage through the grating, (2) is reflected by the reflective support, (3) undergoes a second passage through the grating, and (4) is only diffracted by the grating during one of the first and second passages,
    wherein the reflective support includes a dielectric mirror or a holographic mirror with reflective support strata that are not inclined with respect to the plane of the support, the pitch of the inscribed strata is approximately 630 nm, and the angle of inclination to the normal to the support is approximately 2°.

2. The grating structure according to claim 1, wherein an anti-reflection layer is deposited at an interface between an external medium and the volume holographic grating.

3. The grating structure according to claim 1, wherein the transmission volume grating comprises inclined strata not perpendicular to the plane of the support, and wherein the reflective support is a holographic mirror with strata not inclined with respect to the plane of the support.

4. The grating structure according to claim 1, wherein the transmission volume grating comprises inclined strata not perpendicular to the plane of the support, and wherein the reflective support is a dielectric mirror.

5. The grating structure according to claim 1, wherein the transmission volume grating includes holographic materials, with at least one of the holographic materials belonging to the following group: dichromated gelatine, photopolymer, and sol-gel material.

6. The grating structure according to claim 1, wherein the reflective support and the volume holographic grating are separated by a buffer layer.

7. A laser pulse compression or stretching device comprising the grating structure for high dispersion volume holography of claim 1.

8. The laser pulse compression or stretching device of claim 7, wherein the predetermined mean wavelength of the pulse is approximately 1053 nm, the angle of incidence of the pulse on the structure is approximately 60°.

9. A device configured to generate laser pulses of very high peak power, comprising means for compressing and/or stretching the pulses using the laser pulse compression or stretching device of claim 7.

10. A wavelength division multiplexing device for optical telecommunications, comprising:
    collimation optics; and
    a diffracting element,
    the collimation optics forming, from a light beam of predetermined wavelength output from an optical fiber, a substantially parallel beam incident to the diffracting element, wherein the diffracting element includes the grating structure for high dispersion volume holography of claim 1, adapted to the predetermined wavelength.

11. A wave trap device for optical telecommunications, comprising the grating structure for high dispersion volume holography according to claim 1, wherein characteristics of the grating structure are chosen so that a component at the wavelength to be trapped is diffracted during one of the first and second passages in the transmission grating, and components at other wavelengths are reflected without diffraction by the structure.

12. The grating structure of claim 1, wherein the reflective support is not a display-type hologram configured to produce a holographic image.

13. A grating structure for high dispersion volume holography, comprising:
    a transmission volume holographic grating produced on a reflective support, the grating including inscribed strata inclined to a plane of the support, an angle of inclination of the inscribed strata defined with respect to a normal to the support and a pitch of the strata being chosen such that a light beam of a predetermined mean wavelength, incident on the structure with a predetermined angle of incidence, (1) undergoes a first passage through the grating, (2) is reflected by the reflective support, (3) undergoes a second passage through the grating, and (4) is only diffracted by the grating during one of the first and second passages,
    wherein the inscribed strata are substantially perpendicular to the normal of the support with a pitch of approximately 630 nm, the reflective support includes a holographic mirror with inclined strata, an angle of inclination of the inclined strata to the normal of the support is approximately 89°.

14. A laser pulse compression or stretching device comprising the grating structure for high dispersion volume holography of claim 13.

15. The laser pulse compression or stretching device of claim 14, wherein the predetermined mean wavelength of the light beam is approximately 1053 nm and the angle of incidence of the light beam on the structure is approximately 60°.

16. A device configured to generate laser pulses of very high peak power, comprising means for compressing and/or stretching the pulses using the laser pulse compression or stretching device of claim 14.

17. A wavelength division multiplexing device for optical telecommunications, comprising:
    collimation optics; and
    a diffracting element,
    the collimation optics forming, from a light beam of predetermined wavelength output from an optical fiber, a substantially parallel beam incident to the diffracting element, wherein the diffracting element includes the grating structure for high dispersion volume holography of claim 13, adapted to the predetermined wavelength.

18. A wave trap device for optical telecommunications, comprising the grating structure for high dispersion volume holography according to claim 13, wherein characteristics of the grating structure are chosen so that a component at the wavelength to be trapped is diffracted during one of the first and second passages in the transmission grating, and components at other wavelengths are reflected without diffraction by the structure.

* * * * *